US012366299B2

(12) United States Patent
Kellerson et al.

(10) Patent No.: US 12,366,299 B2
(45) Date of Patent: Jul. 22, 2025

(54) HYDRAULIC CHECK VALVE UTILIZING AN ORTHO-PLANAR SPRING

(71) Applicant: BorgWarner, Inc., Auburn Hills, MI (US)

(72) Inventors: Adam J. Kellerson, Ithaca, NY (US); Steven M. Fleishman, Ithaca, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 25 days.

(21) Appl. No.: 17/823,736

(22) Filed: Aug. 31, 2022

(65) Prior Publication Data

US 2024/0068582 A1   Feb. 29, 2024

(51) Int. Cl.
*F16K 15/06* (2006.01)
*F16H 7/08* (2006.01)
*F16K 17/04* (2006.01)

(52) U.S. Cl.
CPC ......... *F16K 15/064* (2021.08); *F16H 7/0848* (2013.01); *F16K 17/0406* (2013.01); *F16K 17/048* (2013.01); *F16H 2007/0814* (2013.01); *F16H 2007/0859* (2013.01)

(58) Field of Classification Search
CPC .. F16K 15/064; F16K 17/0406; F16K 17/048; F16K 15/144; F16K 2200/3051
See application file for complete search history.

(56) References Cited

U.S. PATENT DOCUMENTS

| | | | |
|---|---|---|---|
| 2,249,971 A * | 7/1941 | Mecorney | F16K 15/064 137/543.17 |
| 2,407,757 A | 9/1946 | Maccallum | |
| 2,767,973 A | 10/1956 | Ter et al. | |
| 4,323,994 A | 4/1982 | Coogler | |
| 5,700,213 A * | 12/1997 | Simpson | F16H 7/0848 474/111 |
| 6,322,468 B1 * | 11/2001 | Wing | F16H 7/0848 474/135 |
| 6,983,924 B2 | 1/2006 | Howell et al. | |
| 7,338,398 B2 | 3/2008 | Whiting et al. | |
| 8,176,809 B2 | 5/2012 | Ihrke et al. | |
| 8,317,643 B2 * | 11/2012 | Hofmann | F16H 7/0848 474/140 |
| 11,125,303 B2 * | 9/2021 | Ullein | F16H 7/08 |

(Continued)

FOREIGN PATENT DOCUMENTS

| CN | 102699928 B | 9/2014 |
|---|---|---|
| CN | 106078791 A | 11/2016 |

(Continued)

OTHER PUBLICATIONS

WO-2019145219-A1, Translation (Year: 2019).*
DE4015708C1, Translation (Year: 1991).*

*Primary Examiner* — Daphne M Barry

(74) *Attorney, Agent, or Firm* — Brown & Michaels, PC

(57) ABSTRACT

An orthoplanar spring for a hydraulic tensioner which has a flat, closed position, in which a flat center portion of the orthoplanar spring seals the inlet hole between the oil supply and the high pressure chamber of the tensioner and an open deformed position in which the flat center portion of the orthoplanar spring moves a distance to unseal the inlet hole such that fluid flows from the inlet supply through the openings in the orthoplanar spring and around the flat center portion to the high pressure chamber.

2 Claims, 16 Drawing Sheets

(56) References Cited

U.S. PATENT DOCUMENTS

2010/0004080 A1* 1/2010 He .................. F16K 17/0406
                                                        137/535
2010/0145510 A1   6/2010 Ihrke et al.

FOREIGN PATENT DOCUMENTS

| CN | 110640783 B | 1/2021 | | |
|----|----|----|----|----|
| DE | 4015708 C1 * | 7/1991 | | |
| JP | 05044647 | 2/1993 | | |
| JP | 3055731 | 1/1999 | | |
| JP | 201084674 | 4/2010 | | |
| JP | 2018517104 A | 6/2018 | | |
| WO | WO-2019145219 A1 * | 8/2019 | ............. | F02M 59/46 |

* cited by examiner

HYDRAULIC CHECK VALVE UTILIZING AN ORTHO-PLANAR SPRING

BACKGROUND

The present invention relates to hydraulic check valves, and more specifically hydraulic check valve utilizing an ortho-planar spring.

Planar torsion springs are used in various technologies for different purposes. US 2010/0145510 is a planar torsion spring that facilitates dexterity for a rotational joint of a robot arm. The planar torsion spring has an outer segment connected to an inner segment through two splines. The inner segment has a central hole surrounded by a series of apertures.

U.S. Pat. No. 2,407,757 is a declutching member that connects a clutch member to the drive shaft as a spring disk. In some of the examples, the spring disk has a center hole with various means of connecting the center hole to an outside rim. In other embodiments in which a solid central hub is present, rigid connections between the outer rim and the center hub are present.

U.S. Pat. No. 2,767,973 is a disk which is bolted on the outer rim and the center to casing sections of an accelerometer.

U.S. Pat. No. 4,323,994 is a geophone spring with outer and inner rings connected by leg members. The inner ring surrounds a central hole.

Other planar springs that act as a reed check valve are also used. These planar springs have dual arms and flat portions that seal and open more than one opening.

SUMMARY

According to one embodiment of the present invention, a hydraulic tensioner is disclosed. The hydraulic tensioner comprises a housing defining a bore connected to a check valve bore through an inlet hole, the check valve bore being in fluid communication with an inlet supply and the inlet hole; a hollow piston slidably received within the bore; a piston spring received within the bore and the hollow piston; a high pressure chamber defined between the bore and the hollow piston; and a check valve received within the check valve bore between the inlet supply and the inlet hole to the bore. The check valve comprises an orthoplanar spring. The orthoplanar spring comprises: an outer rim; a flat center portion; at least two radiused arms connecting the outer rim to the flat center portion, each of the at least two radiused arms having an outer surface and an inner surface; a first semicircular opening defined by an inner circumference of the outer rim, an outer circumference of the flat center portion, the outer surface of a first radiused arm of the at least two radiused arms and an inner surface of a second radiused arm of the at least two radiused arms; and a second semicircular opening defined by at least the inner circumference of the outer rim, the outer circumference of the flat center portion, and an outer surface of the second radiused arm of the at least two radiused arms. The flat center portion is aligned with and adjacent to the inlet hole. The orthoplanar spring has a flat, closed position and an open deformed position in which a distance between a top surface of the outer rim and a bottom surface of the flat center portion is greater than a distance between the top surface of the outer rim and a bottom surface of the at least two radiused arms. When the orthoplanar spring is in the flat, closed position, the flat center portion of the orthoplanar spring seals the inlet hole and wherein when the orthoplanar spring is in the open deformed position, the flat center portion moves the distance between the top surface of the outer rim and the bottom surface of the flat center portion to unseal the inlet hole such that fluid flows from the inlet supply through the first semicircular opening, the second semicircular opening, and around the flat center portion to the high pressure chamber.

According to another embodiment of the present invention, a hydraulic tensioner is disclosed. The hydraulic tensioner comprises a housing defining a bore connected to a check valve bore through an inlet hole, the check valve bore being in fluid communication with an inlet supply and the inlet hole; a hollow piston slidably received within the bore; a piston spring received within the bore and the hollow piston; a high pressure chamber defined between the bore and the hollow piston; and a check valve received within the check valve bore between the inlet supply and the inlet hole to the bore. The check valve comprises an orthoplanar spring. The orthoplanar spring comprises: an outer rim; a flat center portion; at least a first s-shaped arm, a second s-shaped arm and a third s-shaped arm connecting the outer rim to the flat center portion; a first opening defined by an inner circumference of the outer rim, an outer circumference of the flat center portion, the first s-shaped arm and the second s-shaped arm; a second opening defined by the inner circumference of the outer rim, the outer circumference of the flat center portion, the second s-shaped arm and the third s-shaped arm; and a third opening defined by at least the inner circumference of the outer rim, the outer circumference of the flat center portion, and the third s-shaped arm. The flat center portion is aligned with and adjacent to the inlet hole and the orthoplanar spring has a flat, closed position and an open deformed position in which a distance between a top surface of the outer rim and a bottom surface of the flat center portion is greater than a distance between the top surface of the outer rim and a bottom surface of the at least the first s-shaped arm, the second s-shaped arm and the third s-shaped arm. When the orthoplanar spring is in the flat, closed position, the flat center portion of the orthoplanar spring seals the inlet hole and wherein when the orthoplanar spring is in the open deformed position, the flat center portion moves the distance between the top surface of the outer rim and the bottom surface of the flat center portion to unseal the inlet hole such that fluid flows from the inlet supply through the first opening, the second opening, the third opening and around the flat center portion to the high pressure chamber.

According to another embodiment of the present invention, a hydraulic tensioner is disclosed. According to another embodiment of the present invention, a hydraulic tensioner is disclosed. The hydraulic tensioner comprises a housing defining a bore connected to a check valve bore through an inlet hole, the check valve bore being in fluid communication with an inlet supply and the inlet hole; a hollow piston slidably received within the bore; a piston spring received within the bore and the hollow piston; a high pressure chamber defined between the bore and the hollow piston; and a check valve received within the check valve bore between the inlet supply and the inlet hole to the bore. The check valve comprises an orthoplanar spring. The orthoplanar spring comprises: an outer rim; a flat center portion; a single radiused arm connecting the outer rim to the flat center portion, the single radiused arm having an outer surface and an inner surface and surrounding at least 270 degrees of an outer circumference of the flat center portion; a first semicircular opening defined by an inner circumference of the outer rim, and the outer surface of the single radiused arm; and a second semicircular opening defined by at least the inner circumference of the outer rim, the outer circumference of the flat center portion, and an outer surface of the single radiused arm. The flat center portion is aligned with and adjacent to the inlet hole and the orthoplanar spring has a flat, closed position and an open deformed position in which a distance between a top surface of the outer rim and a bottom surface of the flat center portion is greater than a distance between the top surface of the outer rim and a bottom surface of the single radiused arm. When the orthoplanar spring is in the flat, closed position, the flat center portion of the orthoplanar spring seals the inlet hole and wherein when the orthoplanar spring is in the open deformed position, the flat center portion moves the distance between the top surface of the outer rim and the bottom surface of the flat center portion to unseal the inlet hole such that fluid flows from the inlet supply through the first semicircular opening, the second semicircular opening, and around the flat center portion to the high pressure chamber.

In any of the above embodiments, a retainer may be present within the check valve bore between the orthoplanar spring and the inlet hole.

According to another embodiment of the present invention, a hydraulic tensioner is disclosed. The hydraulic tensioner comprises: a housing defining a bore connected to a check valve bore through an inlet hole, the check valve bore being in fluid communication with an inlet supply and the inlet hole; a hollow piston slidably received within the bore; a piston spring received within the bore and the hollow piston; a high pressure chamber defined between the bore and the hollow piston; and a check valve received within the check valve bore between the inlet supply and the inlet hole to the bore. The check valve comprising an orthoplanar spring comprises: an outer rim; a flat center portion having an outer circumference; a single linear arm connecting the outer rim to the flat center portion, the single linear arm having an outer surface; and a semicircular opening defined by an inner circumference of the outer rim, and the outer surface of the single radiused arm and the outer circumference of the single linear arm. A retainer is also within the check valve bore between the orthoplanar spring and the inlet hole. The retainer comprising an annular outer rim of a width; a center portion with a laterally extending protrusion; a plurality of radially extending connecting portions connecting the outer rim to the flat center portion; and a plurality of openings defined between adjacent radially extending connecting portions, the protrusion being aligned with the flat center portion of the orthoplanar spring. The orthoplanar spring has a flat, closed position and an open deformed position in which a distance between a top surface of the outer rim and a bottom surface of the flat center portion is greater than a distance between the top surface of the outer rim and a bottom surface of the single linear arm. When the orthoplanar spring is in the flat, closed position, the flat center portion of the orthoplanar spring seals the inlet hole and wherein when the orthoplanar spring is in the open deformed position, the flat center portion moves until the flat center portion abuts the protrusion of the retainer to unseal the inlet hole such that fluid flows from the inlet supply through the semicircular opening and around the flat center portion to the high pressure chamber. When the orthoplanar spring is in the flat, closed position, the flat center portion of the orthoplanar spring seals the inlet hole and wherein when the orthoplanar spring is in the open deformed position, the flat center portion moves until the flat center portion abuts the protrusion of the retainer to unseal the inlet hole such that fluid flows from the inlet supply through the semicircular opening and around the flat center portion to the high pressure chamber.

DETAILED DESCRIPTION

It is noted that in the embodiments of the present invention, the geometry of the orthoplanar springs of the embodiments described herein improve predicted fatigue life, while maintaining targeted performance characteristics such as flow rate, sealing capability, backflow prevention, full open position flow rates and planar closed position flow rates.

Figure 1:
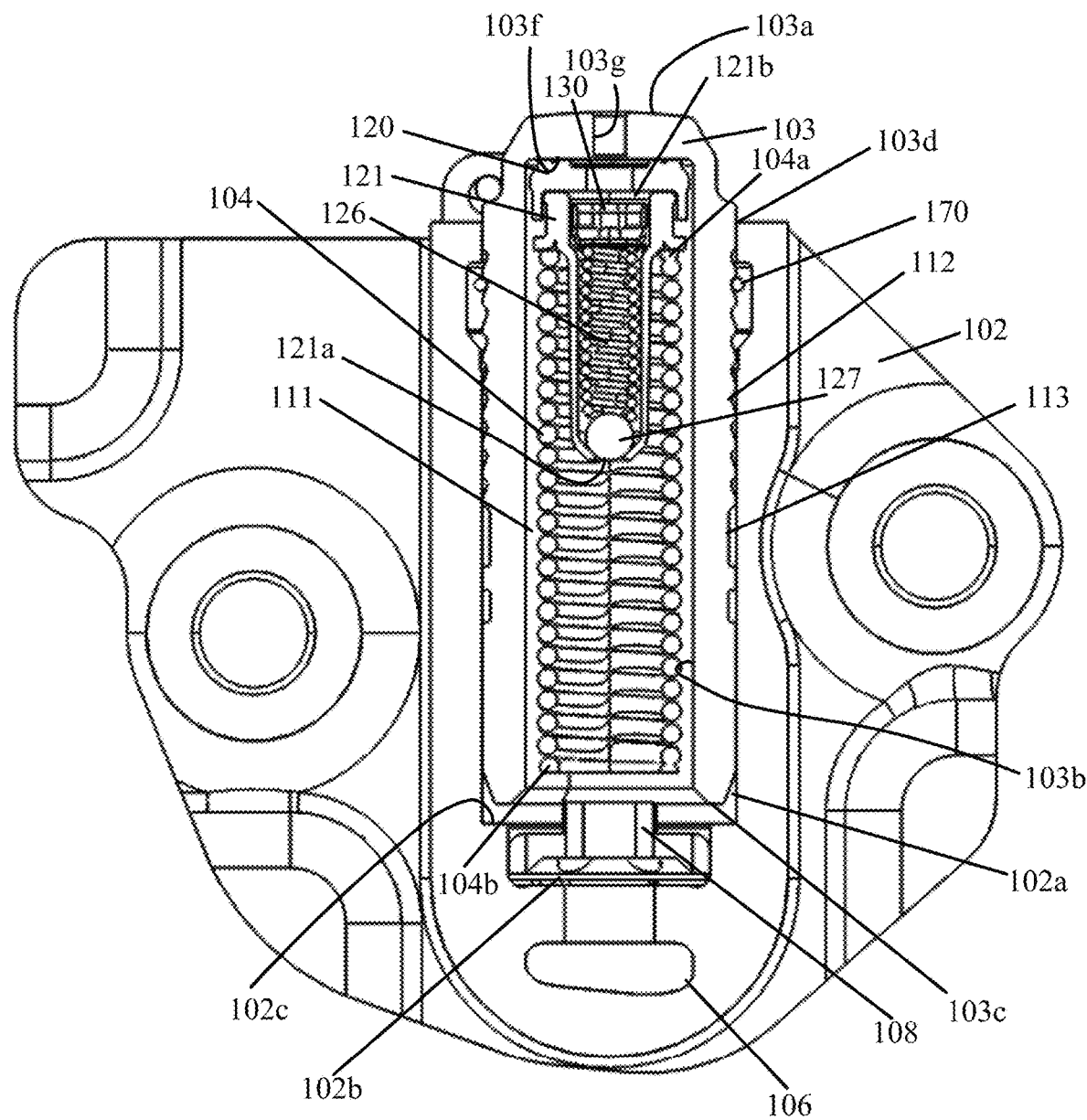
FIG. 1 shows a sectional view of a hydraulic tensioner including the piston.
Figure 2:
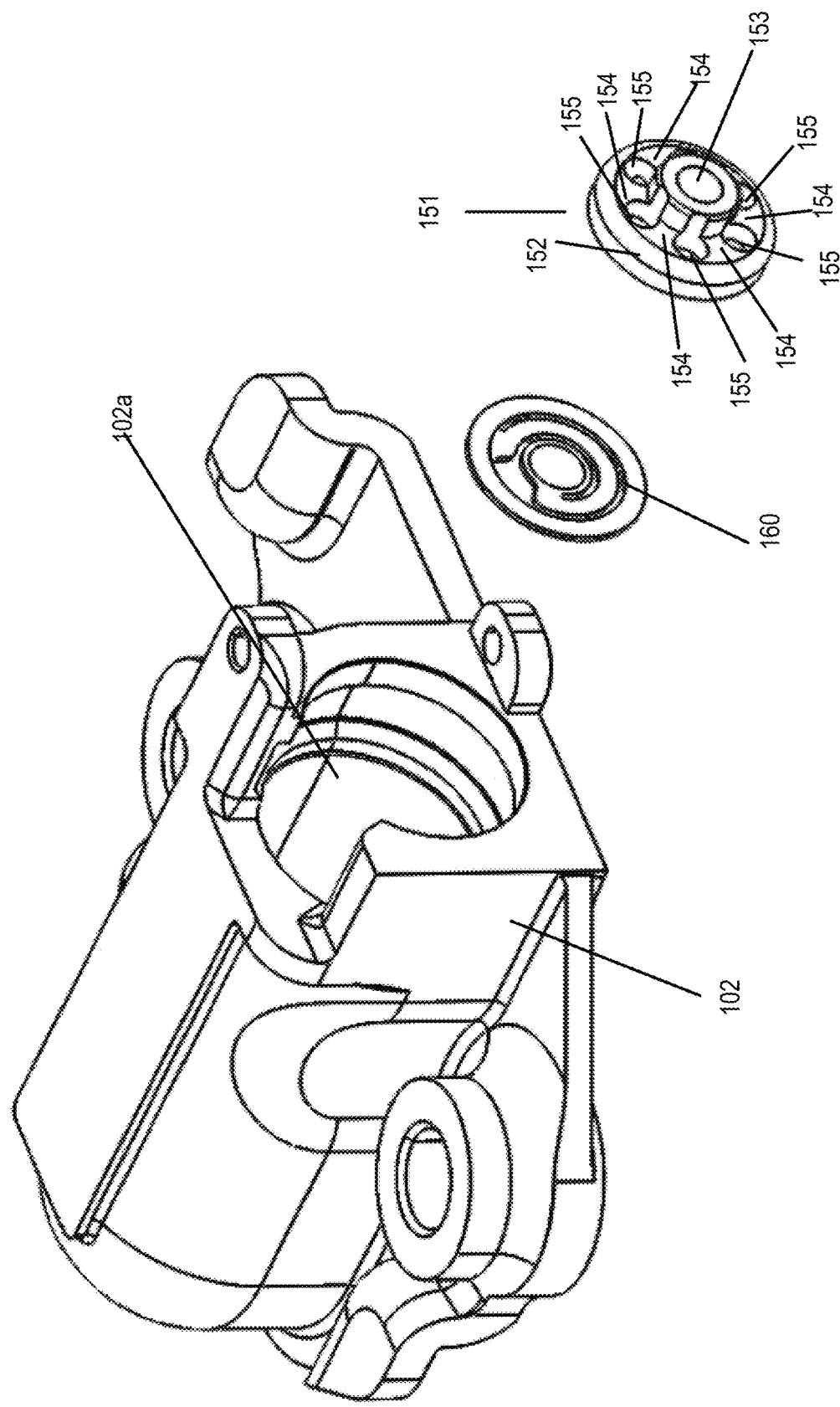
FIG. 2 shows a perspective view of housing of the hydraulic tensioner and an associated check spring disk and retainer.

FIGS. 1-2 show a tensioner of an embodiment of the present invention. The tensioner includes a housing 102 having an axially extending bore 102a. The axially extending bore 102a has a bottom 102c connected to the check valve bore 102b. Slidably received within the axially extending bore 102a is a piston 103. The piston 103 has a body with a first end 103a, a second end 103c, an outer circumference 103d and a hollow interior 103b with a closed interior first end 103f. The outer circumference 103d has a series of ratchet grooves 112 along the length of the body, with a stop groove 113 near the second end 103c being larger than the ratchet grooves 112 and capturing a ratchet clip 170. The ratchet clip 170 is an expandable clip that ratchets in and out of the ratchet grooves 112 as the piston 103 moves away from the housing 102. The ratchet clip 170 prevents the piston 103 from moving towards the housing 102 when the tensioner arm or shoe pushes on the piston 103.

Present within the hollow interior 103b of the piston 103 is a piston spring 104. The piston spring 104 has a first end 104a in contact with a pressure relief valve 120. Alternatively, the first end 104a of the piston spring 104 is in contact with the closed interior first end 103f of the piston 103. A second end 104b of the piston spring 104 in contact with a bottom 102c of the axially extending bore 102a of the housing 102 or a check valve, such as check valve 108. A pressure chamber 111 is formed between the piston 103 and the axially extending bore 102a. Fluid is supplied to the pressure chamber 111 through a supply 106 through an inlet check valve 108. The piston 103 is biased outwards from the housing 102 to bias the chain (not shown) through the first end 103a of the piston 103 by the force of the piston spring 104 and the pressure of oil in the pressure chamber 111.

The pressure relief valve 120 has a body 121 including a first end 121a and a second end 121b. The first end 121a being open to the pressure chamber 111 and a second end 121b open to a tortuous path disk 130. Present within the body 121 is a spring 126 biasing an object 127 towards the first end 121a of the body 121.

When the pressure relief valve 120 is closed, the object 127 blocks the first end 121a of the body 121 of the pressure relief valve 120, fluid flows from the high pressure chamber 111, and vents through the bore 103g of the piston 103.

When the pressure relief valve 120 is open, fluid pressure forces the object 127 and the spring 126 away from the first end 121a of the body 121 and fluid flows through the body 121 of the pressure relief valve 120, through the disk 130, and through bore 103g of the piston 103.

Adjacent the axially extending bore 102a is a check valve bore 102b which is in fluid communication with the supply 106. Received within the check valve bore 102b is check valve 108 which includes an orthoplanar spring 160 and a retainer 151. The retainer 151 has an annular outer rim 152 of a width which is connected to a flat center portion 153 through a series of spokes or radially extending connecting portions 154. Between adjacent spokes 154 are openings 155. Received within the outer rim 152 is an orthoplanar spring 160 that is movable between a flat, planar closed position (see FIG. 2) to a deformed, multilevel open position (see FIG. 3-4). When the orthoplanar spring 160 is present within the retainer 151, a center portion 162 of the orthoplanar spring 160 is aligned with the flat center portion 153 of the retainer 151. The orthoplanar spring 160 has an outer rim 161 connected to a center portion 162 by at least one curved or radiused arm 163 circumferentially surrounding the center portion 162 for at least 270 degrees.

When fluid pressure across the check valve 108 drops due to a drop in pressure within the high pressure chamber 111, the orthoplanar spring 160 moves to the deformed, multilevel open position, such that fluid from supply 106 flows through the orthoplanar spring 160 and the openings 155 of the retainer 151 and into the pressure chamber 111. The retainer 151 limits the amount of opening of the orthoplanar spring 160 to avoid plastic deformation. When the fluid pressure across the check valve 108 is greater than the spring force of the orthoplanar spring 160, the spring is in a flat, planar closed position and fluid is prevented from flowing from the pressure chamber 111 into the supply 106 by the orthoplanar spring 160.

Figure 3:
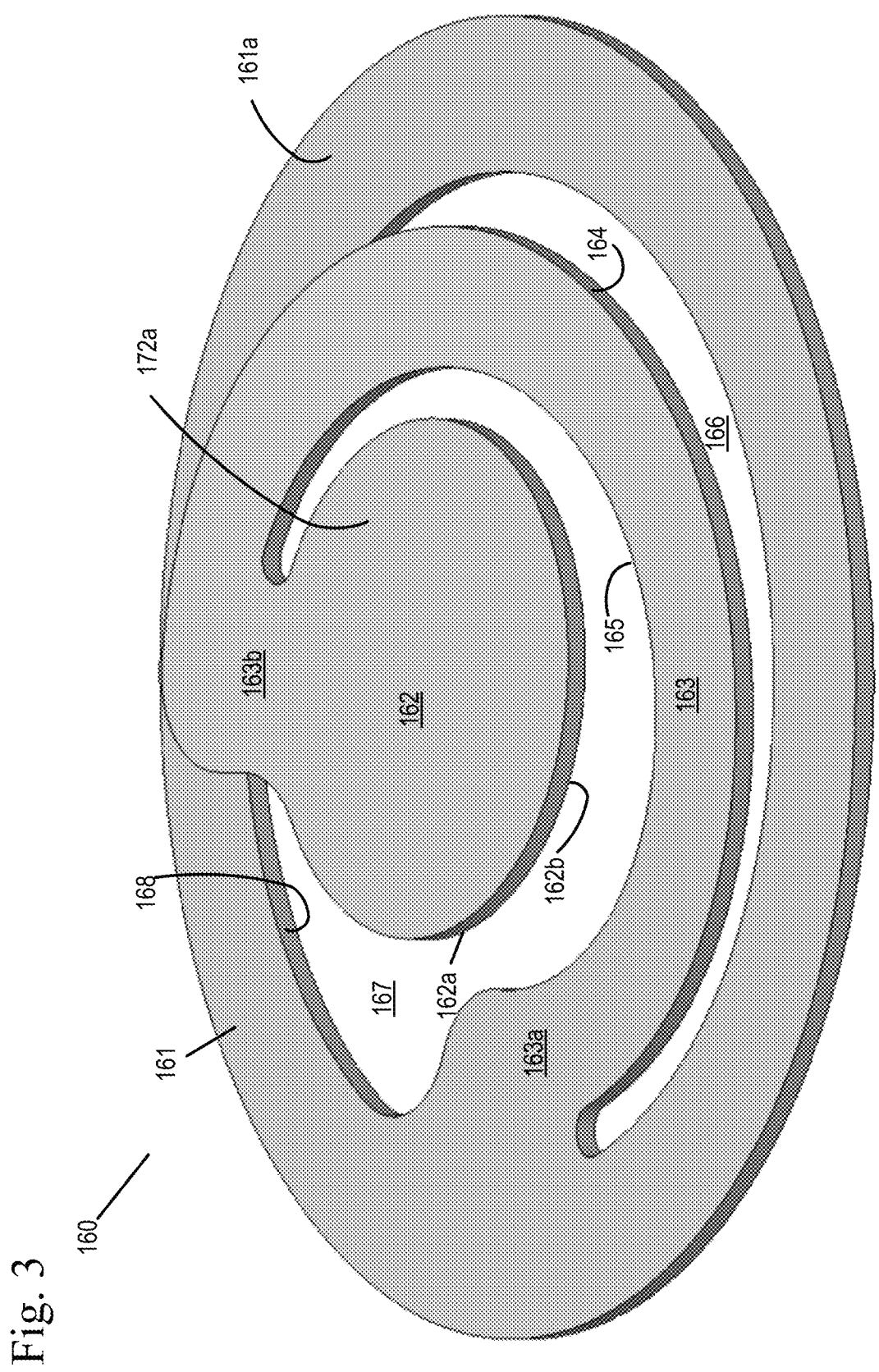
FIG. 3 shows a top perspective view of an orthoplanar spring of a first embodiment of the present invention.
Figure 4:
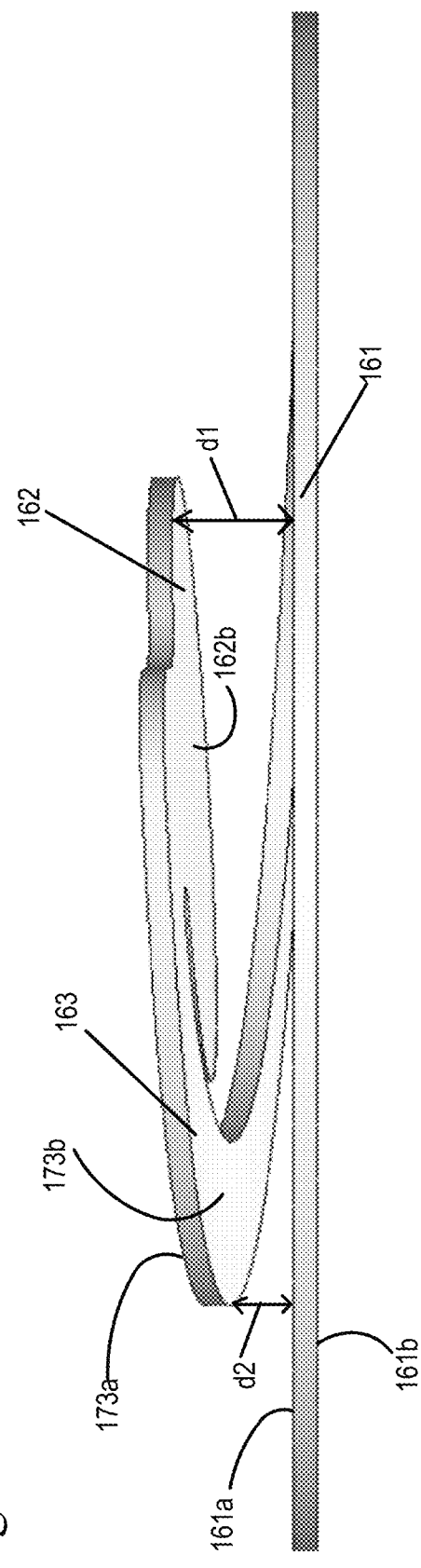
FIG. 4 shows a side view of the orthoplanar spring of FIG. 3.

Referring to FIGS. 3-4, a single radiused or curved arm 163 connects the outer rim 161 to the center portion 162. A first semicircular space 166 is present between the inner circumference 168 of the outer rim 161 and the outer surface 164 of the radiused arm 163 and a second semicircular space 167 is present between the outer circumference 162a of the center portion 162 and an inner surface 165 of the radiused arm 163 and the outer circumference 162a of the center portion 162 and the inner circumference 168 of the outer rim 161. The first end 163a of the radiused arm 163 is connected to the outer rim 161 and the second end 163b of the radiused arm 163 is connected to the center portion 162. The outer surface 164 of the radiused arm 163 is the surface adjacent to the inner circumference 168 of the outer rim 161 and the inner surface 165 of the radiused arm 163 is the surface of the radiused arm 163 surrounding the center portion 162. The center portion 162, the outer rim 161, and the radiused arm 163 each have a first surface 161a, 172a, 173a and a second surface 161b, 162b, 173b, opposite the first surface 161a, 172a, 173a. The second surface 161b, 162b, 163b is adjacent to and closer to the high pressure chamber of the piston 103.

The orthoplanar spring 160 is moveable between a flat, closed position and a deformed, multilevel open position. In the flat, closed position shown in FIG. 2, the center portion 162 abuts and seals off the inlet hole to the bore 102a receiving the piston 103. When the pressure in the high pressure chamber 111 is less than the spring force of the orthoplanar spring 160, the orthoplanar spring 160 moves to the deformed, multilevel open position allowing fluid to flow from oil inlet supply 106, through the first and second semicircular spaces 166, 167, through the inlet hole and into the high pressure chamber 111.

When the orthoplanar spring 160 is in the deformed, multilevel open position, the center portion 162 is biased outwards from the outer rim 161 such that the second surface 162b of the center portion 162 is at a distance d1 from a first surface 161a the outer rim 161 that is greater than the distance d2 between a second surface 173b of the arm 163 and the first surface 161a of the outer rim 161. In this position, the center portion 162 of the orthoplanar spring 160 abuts the flat center portion 153 of the retainer 151, such that the retainer 151 limits the travel of the orthoplanar spring 160 in the deformed position.

Movement of the orthoplanar spring 160 from the flat, planar closed position to the deformed, multilevel open position allows fluid to flow through the first semicircular space 166 and the second semicircular space 167 into the high pressure chamber 111. Any force on the piston 103 towards the housing 102 causes any fluid present in the high pressure chamber 111 to flow towards supply 106, which pushes the orthoplanar spring 160 towards a flat, planar closed position.

It is noted that while a retainer 151 is present in the tensioner, the orthoplanar spring 160 can function as the check valve 108 without the presence of the retainer 151.

Figure 5:
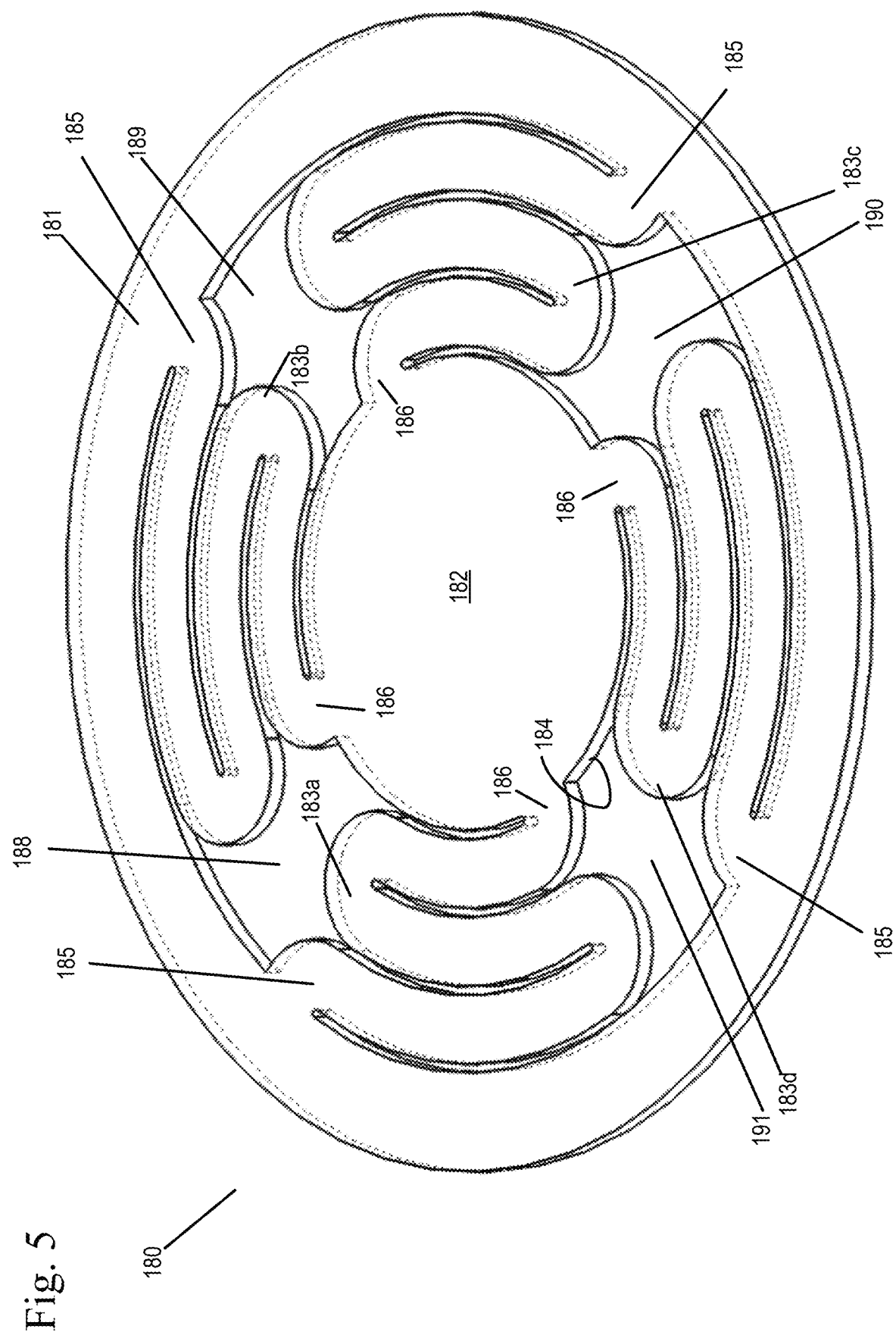
FIG. 5 shows a top view of an orthoplanar spring of a second embodiment.
Figure 6:
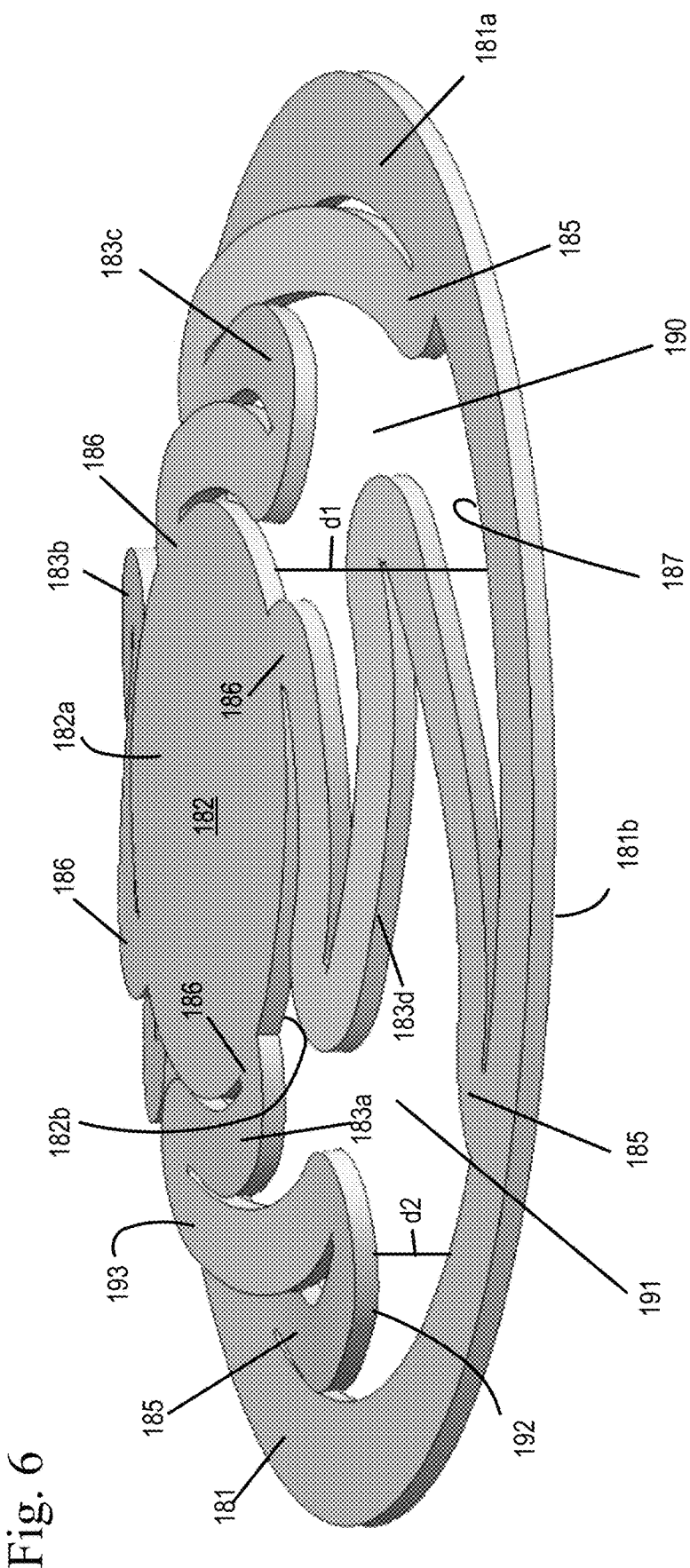
FIG. 6 shows a top perspective view the orthoplanar spring of FIG. 5.

FIGS. 5-6 show an orthoplanar spring of another embodiment. The orthoplanar spring 180 has an outer rim 181 connected to a center portion 182 by at least one s-shaped arm 183a-183d. In this case, four s-shaped arms 183a-183d are equally spaced around the outer circumference 184 of the center portion 182. A first end 185 of each of the four s-shaped arms 183a-183d is connected to an inner circumference 187 of the outer rim 181 and a second end 186 of each of the four s-shaped arms 183a-183d is connected to the outer circumference 184 of the center portion 182. A first opening or space 188 is present between s-shaped arm 183a, s-shaped arm 183b, the outer circumference 184 of the center portion 182 and the inner circumference 187 of the outer rim 181. A second opening or space 189 is present between s-shaped arm 183b, s-shaped arm 183c the outer circumference 184 of the center portion 182 and the inner circumference 187 of the outer rim 181. A third opening or space 190 is present between s-shaped arm 183c, s-shaped arm 183d the outer circumference 184 of the center portion 182 and the inner circumference 187 of the outer rim 181. A fourth opening or space 191 is present between s-shaped arm 183d, s-shaped arm 183a the outer circumference 184 of the center portion 182 and the inner circumference 187 of the outer rim 181. The center portion 182, the outer rim 181, and the s-shaped arms 183a, 183b, 183c, 183d each have a first surface 182a, 181a, 193 and a second surface 182b, 181b, 192, opposite the first surface 182a, 181a, 193. The second surface 182b, 181b, 192 is adjacent to and closer to the high pressure chamber 111 of the piston 103.

It is noted that the s-shaped arms 183a-183d have radiused and curved bends.

The orthoplanar spring 180 is moveable between a flat, closed position and a deformed, multilevel open position. In the flat, closed position shown in FIG. 5, the center portion 182 abuts and seals off the inlet hole to the bore 102a receiving the piston 103. When the pressure in the high pressure chamber 111 is less than the spring force of the orthoplanar spring 180, the orthoplanar spring 180 moves to the deformed, multilevel open position allowing fluid to flow from oil inlet supply 106, through the first and second openings or spaces 188, 189, 190, 191 through the inlet hole and into the high pressure chamber 111.

When the orthoplanar spring 180 is in the deformed, multilevel open position, the center portion 182 is biased outwards from the outer rim 181 such that the second surface 182b of the center portion 182 is at a distance d1 from a first surface 181a the outer rim 181 that is greater than the distance d2 between a second surface 192 of s-shaped arms 183a-183d and the first surface 181a of the outer rim 181. If a retainer 151 is present within the tensioner, the center portion 182 of the orthoplanar spring abuts the flat center portion 153 of the retainer 151, such that the retainer limits the travel of the orthoplanar spring 180 in the deformed position.

Movement of the orthoplanar spring 180 from the flat, planar closed position to the deformed, multilevel open position allows fluid to flow through the spaces or openings 188-191 and into the high pressure chamber 111. Any force on the piston 103 towards the housing 102 causes any fluid present in the high pressure chamber 111 to flow towards supply 106, which pushes the orthoplanar spring 180 towards a flat, planar closed position.

Figure 7:
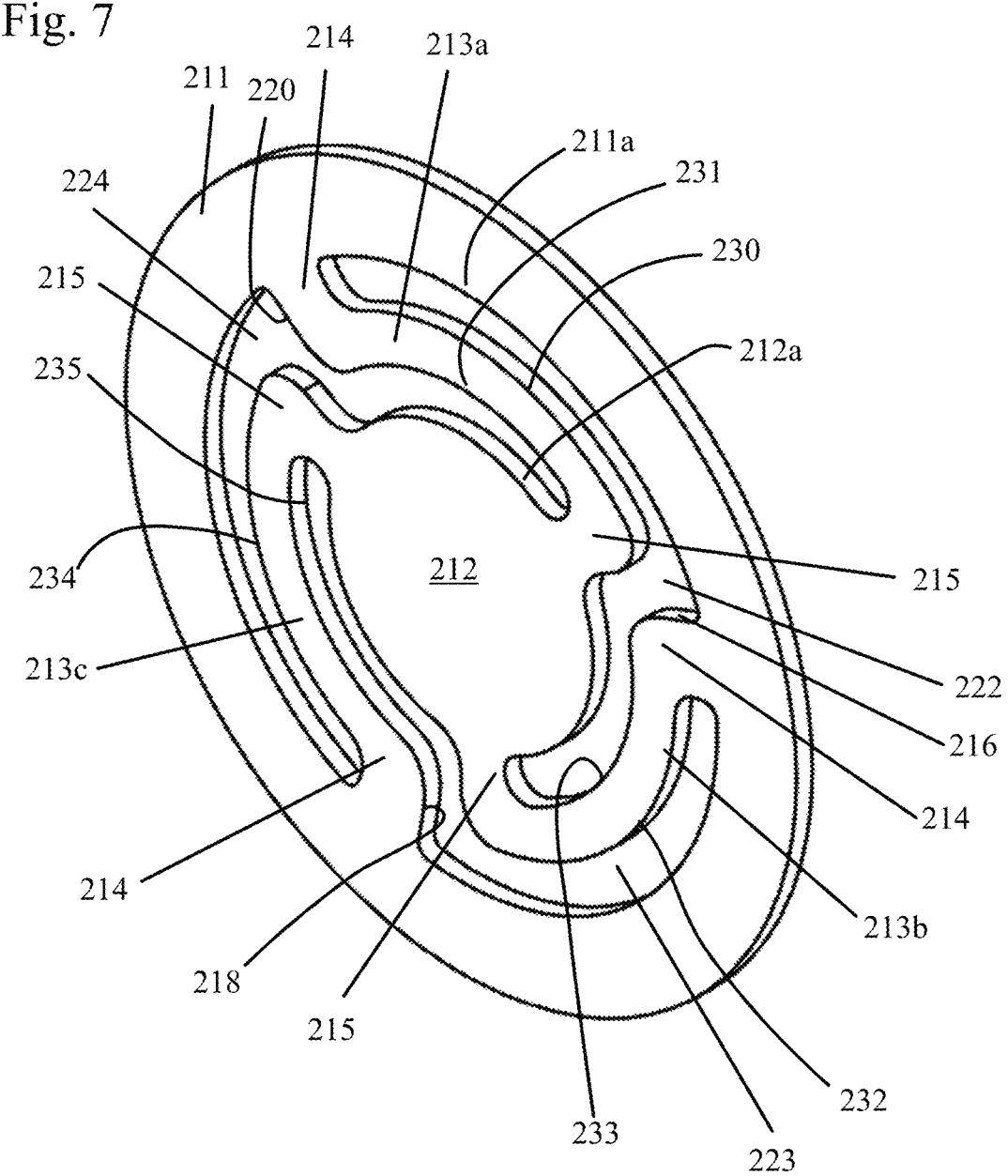
FIG. 7 shows an isometric view of an orthoplanar spring a third embodiment.
Figure 8:
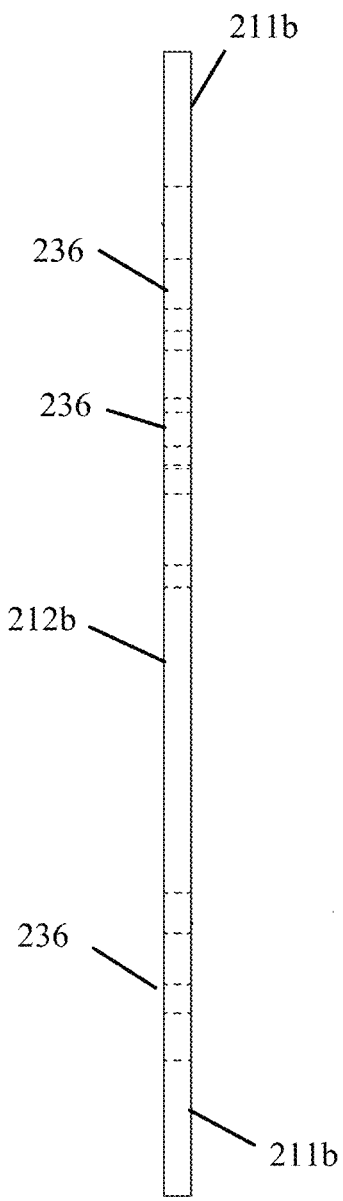
FIG. 8 shows a side view of the orthoplanar spring of FIG. 7.
Figure 9:
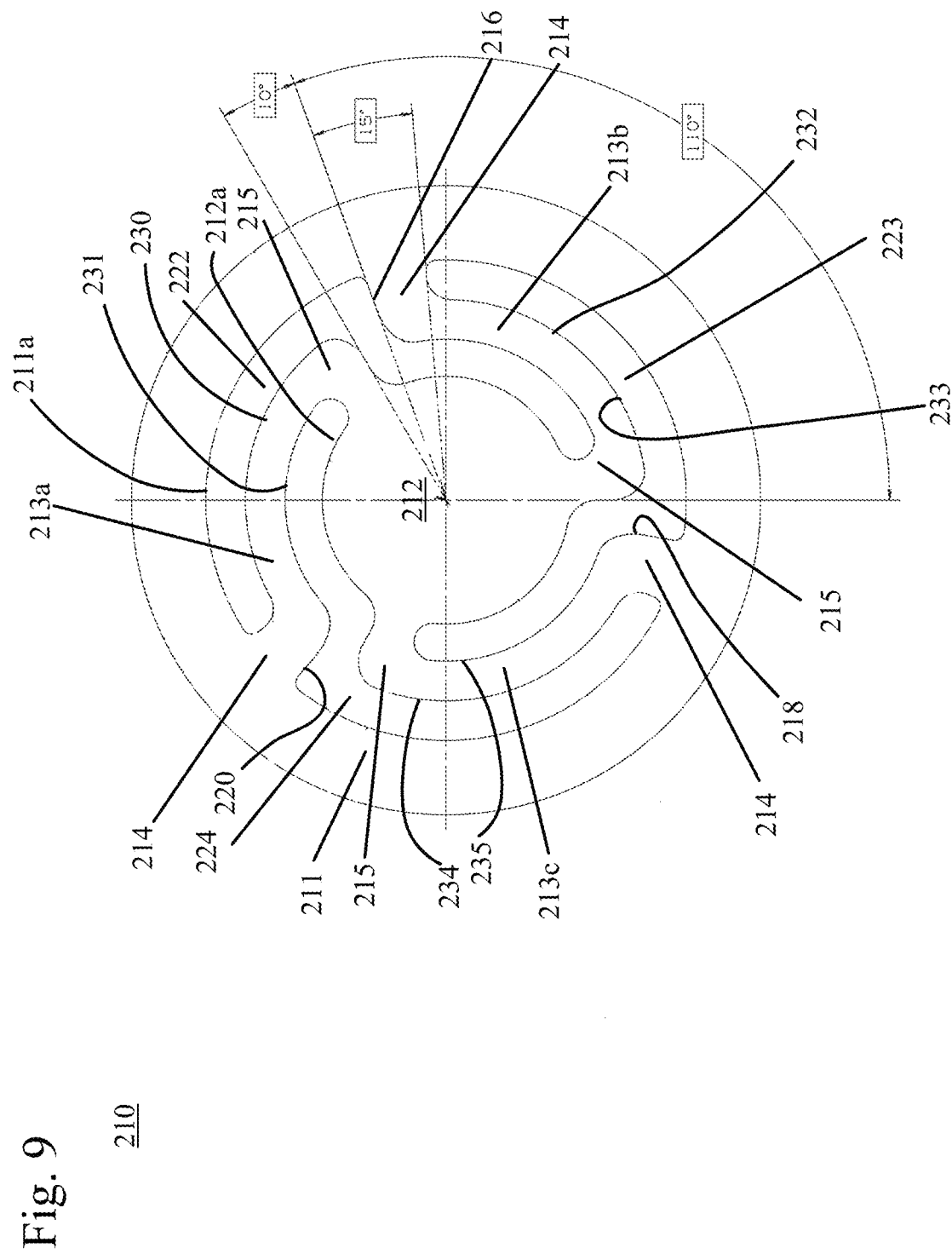
FIG. 9 shows a top view of the orthoplanar spring if FIG. 7.

FIGS. 7-9 show an orthoplanar spring of a third embodiment. The orthoplanar spring 210 has an outer rim 211 connected to a center portion 212 by three curved or radiused arms 213a-213c. Each of the three curved arms 213a-213c has a first end 214 connected to an inner circumference 211a of the outer rim 211 and a second end 215 connected to an outer circumference 212a of the center portion 212. A first semicircular space 222 is present between the inner circumferential edge 211a of the outer rim 211, an outer surface 230 of the first arm 213a, an outer circumference 212a of the center portion 212 and an inner surface 233 of the second arm 213b. A second semicircular space 223 is present between the inner circumferential edge 211a of the outer rim 211, an outer surface 232 of the second arm 213b, an outer circumference 212a of the center portion 212 and an inner surface 235 of the third arm 213c. A third semicircular space 224 is present between the inner circumferential edge 211a of the outer rim 211, an outer surface 234 of the third arm 213c, an outer circumference 212a of the center portion 212 and an inner surface 231 of the first arm 213a.

In an embodiment of the present invention, each of the curved arms 213a-213c surrounds approximately a third of the outer circumference 212a of the center portion 212. More specifically, curved arm 213b surrounds approximately 120 degrees of the outer circumference 212a of the center portion 212, measured between a first edge 216 of the first end 214 of a curved arm 213b, defining a first circumferential opening 222 to a first edge 218 of curved arm 213c defining a second circumferential opening 223.

Curved arm 213c surrounds approximately 120 degrees of the outer circumference 212a of the center portion 212, measured between a first edge 218 of the first end 214 of curved arm 213c, defining the second circumferential opening 223 to a first edge 220 of the curved arm 213a defining a third circumferential opening 224.

Curved arm 213a surrounds approximately 120 degrees of the outer circumference 212a of the center portion 212, measured from a first edge 220 of the first end of the curved arm 213a, defining the third circumferential opening 224 to a first edge 216 of curved arm 213b defining the first circumferential opening 222.

In this embodiment, the three curved arms 213a-213c are equally spaced around the outer circumference 212a of the center portion 212.

When the orthoplanar spring 210 is in the deformed, multilevel open position, the center portion 212 is biased outwards from the outer rim 211 such that a bottom surface 212b of the center portion 212 is at a distance from a top surface 211b of the outer rim 211 that is greater than the distance between a bottom surface 236 of any one of the three arms 213a-213c and the top surface 211b of the outer rim 211. In this position, if a retainer 151 is present in the tensioner, the center portion 282 of the orthoplanar spring 210 abuts and biases the flat center portion 153 of the retainer 151.

Movement of the orthoplanar spring 210 from the flat, planar closed position to the deformed, multilevel open position allows fluid to flow through the circumferential spaces 222, 223, 224 and the into the high pressure chamber 111. Any force on the piston 103 towards the housing 102 causes any fluid present in the high pressure chamber 111 to flow towards supply 106, which pushes the orthoplanar spring 210 towards a flat, planar closed position.

Figure 10:
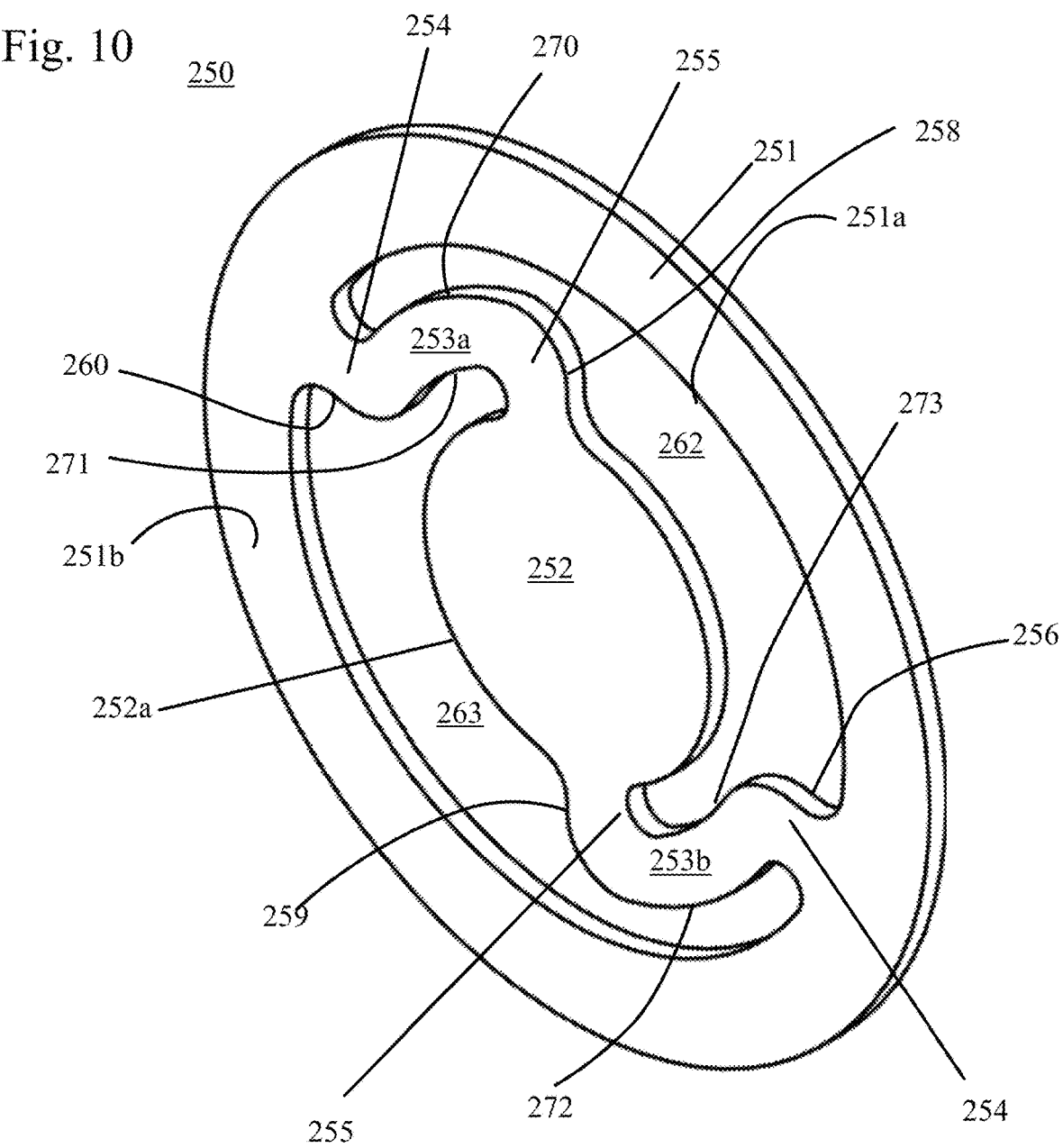
FIG. 10 shows an isometric view of an orthoplanar spring of a fourth embodiment.
Figure 11:
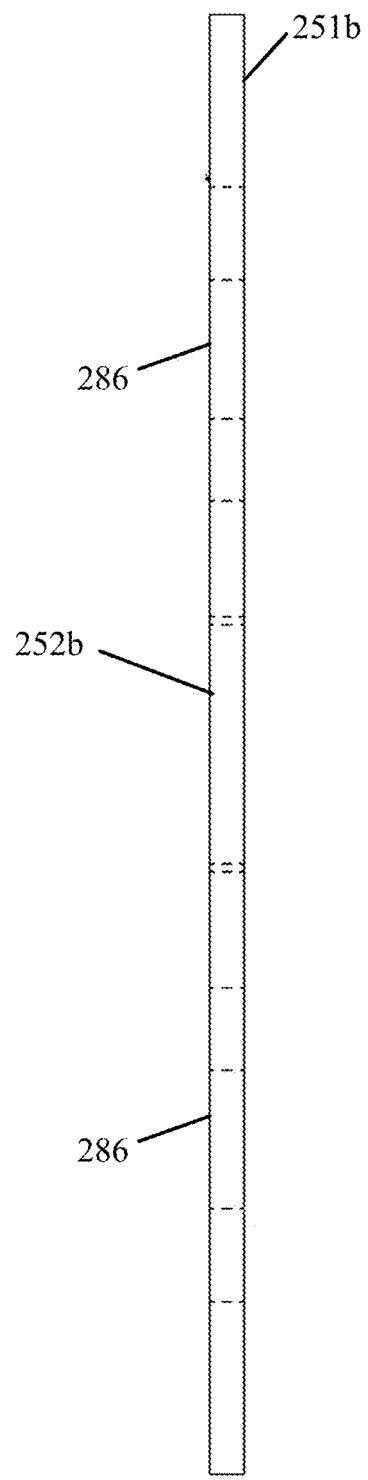
FIG. 11 shows a side view of the orthoplanar spring of FIG. 10.
Figure 12:
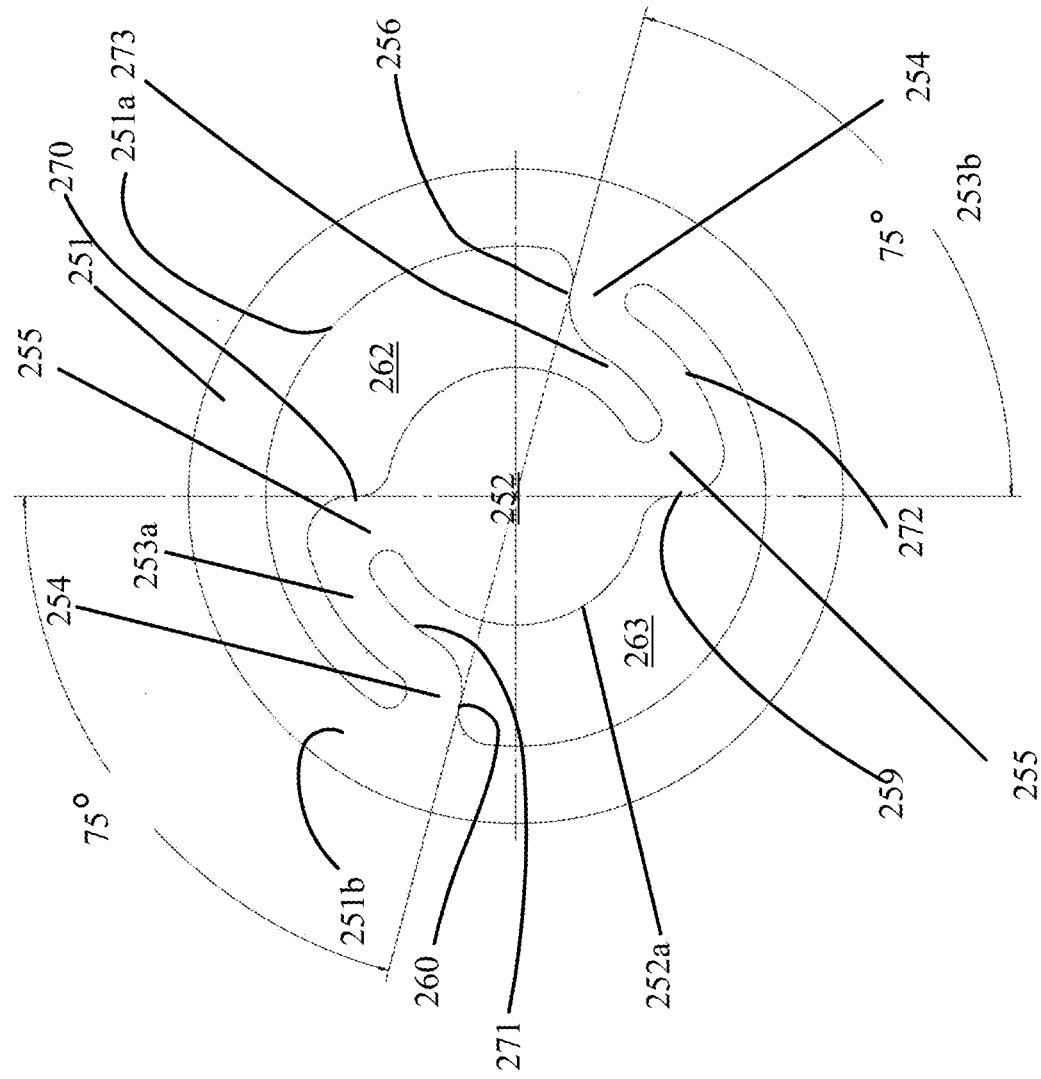
FIG. 12 shows a top view of the orthoplanar spring of FIG. 10.

FIGS. 10-12 show an orthoplanar spring of a fourth embodiment. The orthoplanar spring 250 has an outer rim 251 connected to a center portion 252 by two curved arms 253a, 253b. Each of the two curved arms 253a, 253b has a first end 254 connected to an inner circumference 251a of the outer rim 251 and a second end 255 connected to an outer circumference 252a of the center portion 252. A first semicircular space 262 is present between the inner circumferential edge 251a of the outer rim 251, an outer surface 270 of the first arm 253a, an outer circumference 252a of the center portion 252 and an inner surface 273 of the second arm 253b. The second semicircular space 263 is present between the inner circumferential edge 251a of the outer rim 251, an outer surface 272 of the second arm 253b, an outer circumference 252a of the center portion 252 and an inner surface 271 of the third arm 253c.

In an embodiment of the present invention, each of the curved arms 253a-253b surrounds approximately a third of the outer circumference 252a of the center portion 252. More specifically, curved arm 253b surrounds approximately 20 percent or 75 degrees of the outer circumference 252a of the center portion 252, measured between a first edge 256 of the first end 254 of a curved arm 253b, defining a first circumferential opening 262 to a first edge 258 of the second end 255 of the curved arm 253a defining a second semicircular opening 263. Curved arm 253a surrounds approximately 75 degrees of the outer circumference 252a of the center portion 252, measured between a first edge 259 of the second end 255 of curved arm 253b, defining the second semicircular opening 263 to a first edge 260 of the first end 254 of the curved arm 253a.

In this embodiment, the two curved arms 253a-253b are equally spaced around the outer circumference 212a of the center portion 212.

When the orthoplanar spring 250 is in the deformed, multilevel open position, the center portion 252 is biased outwards from the outer rim 251 such that a bottom surface 252b of the center portion 252 is at a distance from a top surface 251b of the outer rim 251 that is greater than the distance between a bottom surface 286 of any one of the two curved arms 253a-253b and the top surface 251b of the outer rim 251. In this position, if a retainer 151 is present in the tensioner, the center portion 252 of the orthoplanar spring 250 abuts and biases the flat center portion 153 of the retainer 151.

Movement of the orthoplanar spring from the flat, planar closed position to the deformed, multilevel open position allows fluid to flow through the semicircular spaces 262, 263 and the into the high pressure chamber 111. Any force on the piston 103 towards the housing 102 causes any fluid present in the high pressure chamber 111 to flow towards supply 106, which pushes the orthoplanar spring 250 towards a flat, planar closed position.

Figure 13:
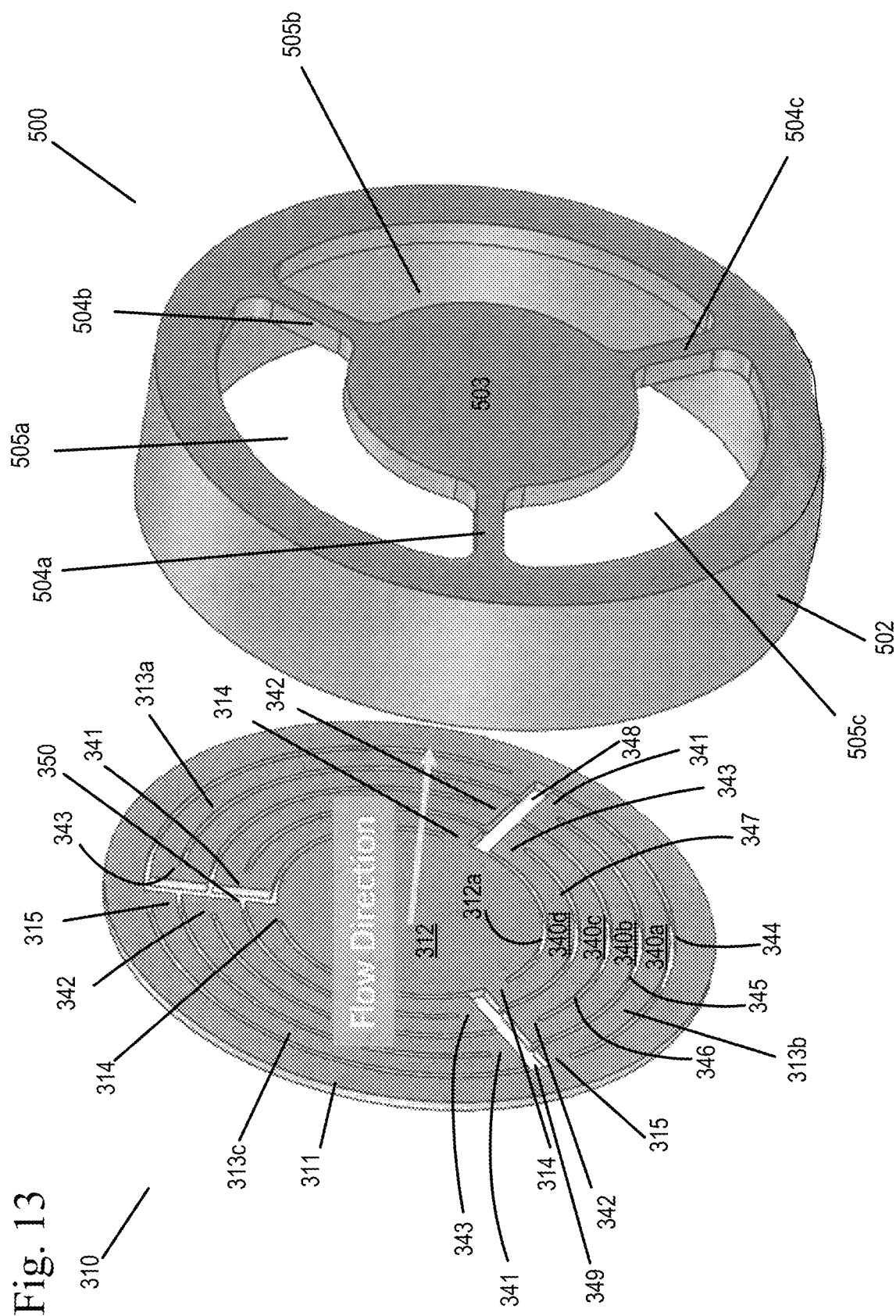
FIG. 13 shows an orthoplanar spring of a fifth embodiment with a retainer received within in the tensioner housing.
Figure 14:
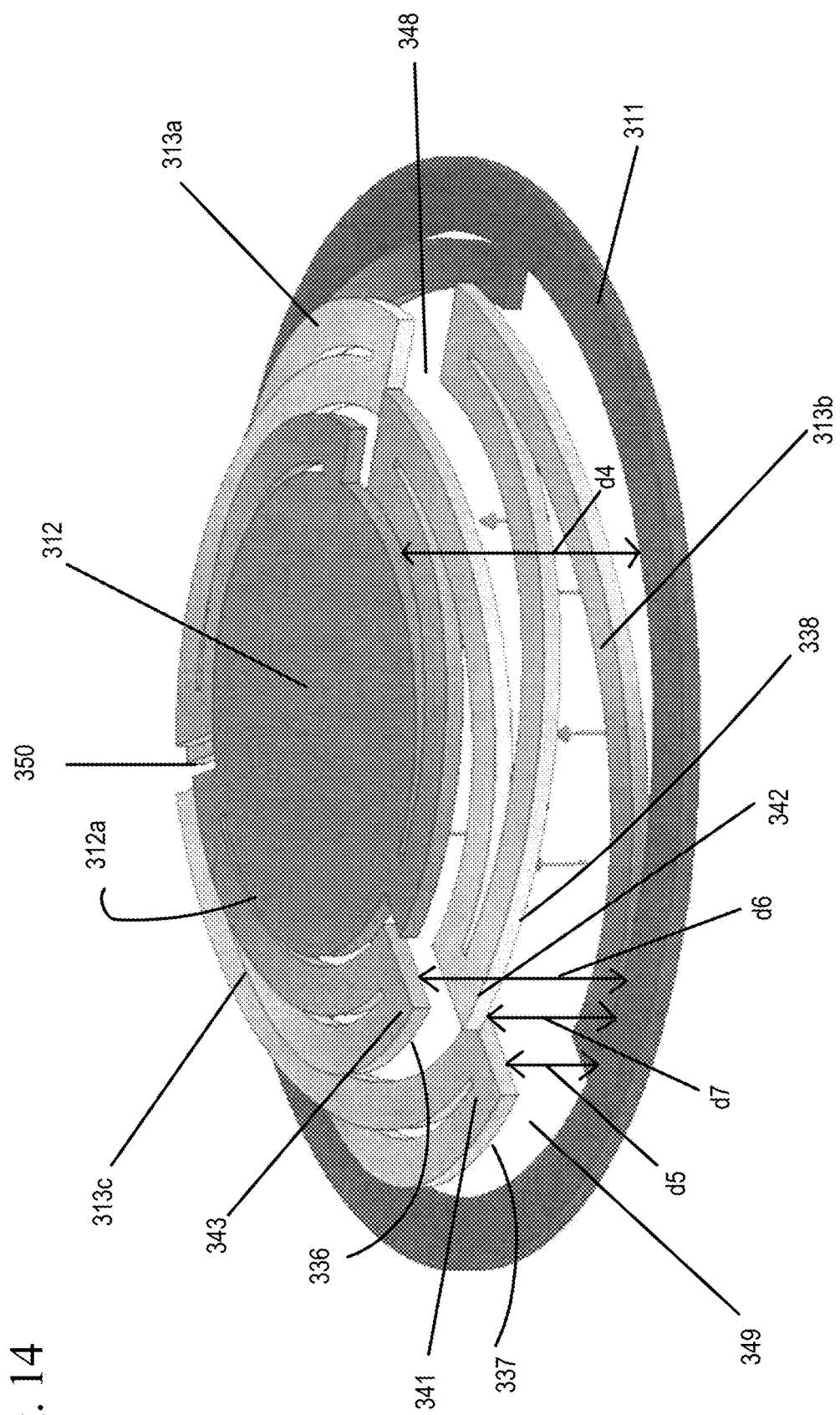
FIG. 14 shows a top perspective view of the orthoplanar spring of FIG. 13.

FIGS. 13-14 show an orthoplanar spring of a fifth embodiment. The orthoplanar spring 310 has an outer rim 311 connected to a center portion 312 by three serpentine arms 313a-313c.

Each serpentine or s-shaped arm 313a-313c has a first end 315 connected to the outer rim 311 and a second end 314 connected to the center portion 312. Between the first end 315 and the second end 314 are semicircular portions 340a-340d and connecting portions 341-343. Between each of the semicircular portions 340a-340d are semicircular spaces 344-347. More specifically, for each serpentine arm 313a-313c, the first end 315 is connected to semicircular portion 340a, which connects to connecting portion 341. Connecting portion 341 is also connected to semicircular portion 340b. Semicircular portion 340b is connected to connecting portion 342. Connecting portion 342 is connected to semicircular portion 340c. Semicircular portion 340c is connected to connection portion 343. Connecting portion 343 is connected to semicircular portion 340d. Semicircular portion 340d is connected to the center portion 312 by the second end 314. Between semicircular portion 340a and semicircular portion 340b is a semicircular space 344. Between semicircular portion 340b and semicircular portion 340c is a semicircular space 345. Between semicircular portion 340c and semicircular portion 340d is a semicircular space 346.

It is noted that the bends of the serpentine arms 313a-313c are not radiused, but straight.

A first circumferential space 348 is present between the outer circumference 312a of the center portion 312 and between the first serpentine arm 313a and the second serpentine arm 313b. More specifically, the first circumferential space 348 is defined by the outer circumference 312a of the center portion 312, the semicircular portion 340d of the second serpentine arm 313b, connecting portions 343 and 341 of the second serpentine arm 313b and the connecting portion 342 of the first serpentine arm 313a.

A second circumferential space 349 is present between the outer circumference 312a of the center portion 312 and between the second serpentine arm 313b and the third serpentine arm 313c. More specifically, the second circumferential space 349 is defined by the outer circumference 312a of the center portion 312, the semicircular portion 340d of the third serpentine arm 313c, connecting portions 343 and 341 of the third serpentine arm 313c and the connecting portion 342 of the second serpentine arm 313b.

A third circumferential space 350 is present between the outer circumference 312a of the center portion 312 and between the third serpentine arm 313c and the first serpentine arm 313a. More specifically, the third circumferential space 350 is defined by the outer circumference 312a of the center portion 312, the semicircular portion 340d of the first serpentine arm 313a, connecting portions 343 and 341 of the first serpentine arm 313a and the connecting portion 342 of the third serpentine arm 313c.

In this embodiment, the three serpentine arms 313a-313c are equally spaced around the outer circumference 312a of the center portion 312.

The orthoplanar spring 310 is received within the retainer shown in FIG. 13. The retainer 500 is received within the check valve bore 102b with the orthoplanar spring 310. The retainer 500 has an annular outer rim 502 of a width which is connected to a flat center portion 503 through three spokes or radially extending connecting portions 504a-504c. Between adjacent spokes 504a-504c are three openings 505a-505c. More specifically, between radially extending connecting portions 504a and radially extending connecting portions 504b is opening 505a. Between radially extending connecting portion 504b and radially extending connecting portion 504c is opening 505b. Between radially extending connecting portion 504c and radially extending connecting portion 504a is opening 504c.

When the orthoplanar spring 312 is in the deformed, multilevel open position, the center portion 312 is biased outwards from the outer rim 311 such that a bottom surface 312b of the center portion 312 is at a distance d4 from a top surface 311b of the outer rim 311 that is greater than the distance d5 between a bottom surface 337 of connecting portion 341 of the three arms 313a-313c, greater than the distance d6 between a bottom surface 336 of connecting portion 343 of the three arms 313a-313c, or greater than the distance d7 between a bottom surface 338 of connecting portion 342 of the three arms 313a-313c. In this position, the center portion 312 of the orthoplanar spring 310 abuts and biases the flat center portion 503 of the retainer 500.

Movement of the orthoplanar spring 312 from the flat, planar closed position to the deformed, multilevel open position allows fluid to flow through the circumferential spaces 341-343 and the into the high pressure chamber 111. Any force on the piston 103 towards the housing 102 causes any fluid present in the high pressure chamber 111 to flow towards supply 106, which pushes the orthoplanar spring 310 towards a flat, planar closed position.

Figure 15:
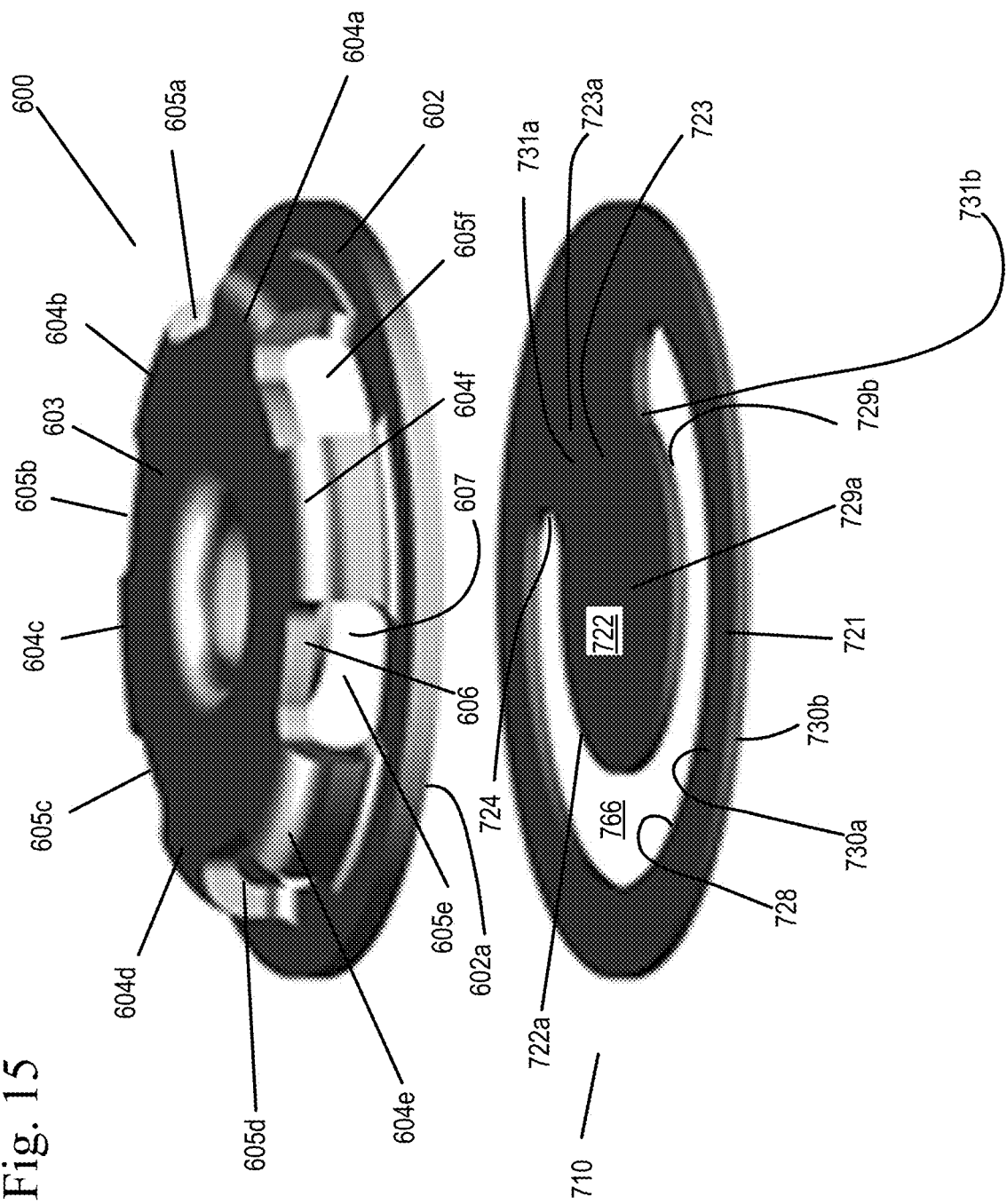
FIG. 15 shows a retainer and an orthoplanar spring of a sixth embodiment.
Figure 16:
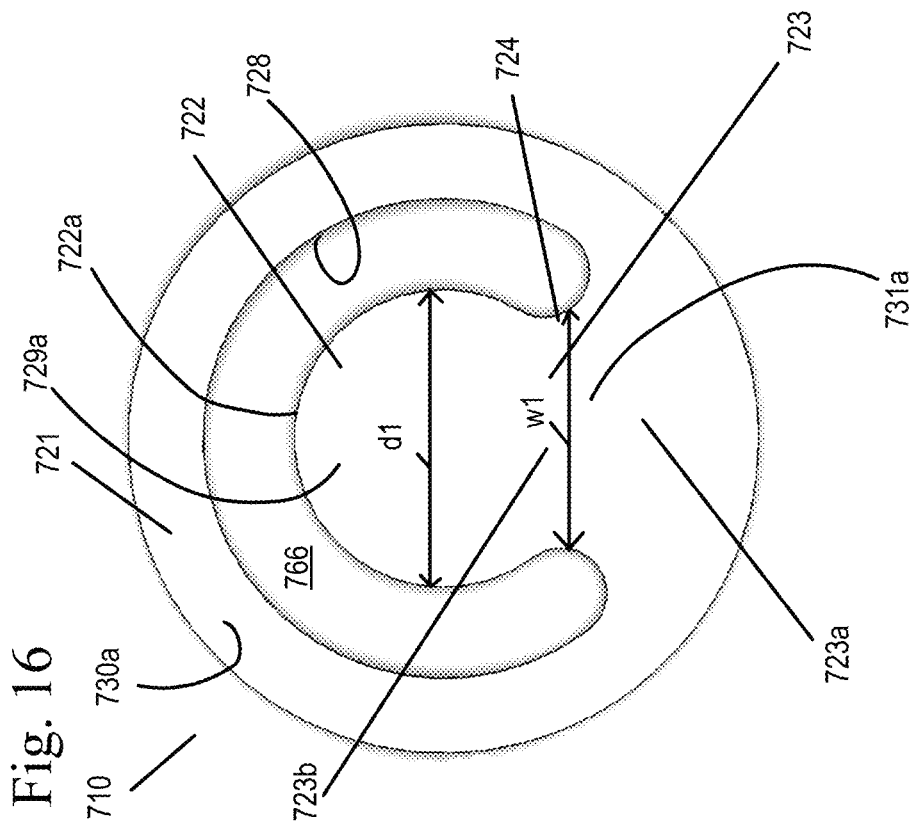
FIG. 16 shows a top view of the orthoplanar spring of FIG. 15.

FIGS. 15-16 show a retainer and an orthoplanar spring of a sixth embodiment. The retainer in this embodiment includes an additional preload protrusion.

The retainer 600 is received within the check valve bore 102b with the orthoplanar spring 710. The retainer 600 has an annular outer rim 602 of a width which is connected to a center portion 603 through a plurality of radially extending connecting portions 604a-604f. Between adjacent spokes 604a-604f are a plurality of openings 605a-605f.

More specifically, between radially extending connecting portions 604a and radially extending connecting portions 604b is opening 605a. Between radially extending connecting portion 604b and radially extending connecting portion 604c is opening 605b. Between radially extending connecting portion 604c and radially extending connecting portion 604d is opening 605c. Between radially extending connecting portion 604d and radially extending connecting portion 604e is opening 605d. Between radially extending connecting portion 604e and radially extending connecting portion 604f is opening 604e. Between radially extending connecting portion 604f and radially extending connecting portion 604a is opening 605f.

The center portion 603 includes a protrusion 606 which extends laterally within a space 607 defined by the plurality of radially extending connecting portions 604a-604f, the outer rim 602 and the center portion 603.

The retainer 600 receives orthoplanar spring 710. The orthoplanar spring 710 has a single linear arm 723 connecting the outer rim 721 to a flat center portion 722. A single semicircular space 766 is present between the inner circumference 728 of the outer rim 721 and the outer surface 724 of the single linear arm 723 and the outer circumference 722a of center portion 722. It is noted that the linear arm 723 has a width w1 that is less than the diameter d1 of the center portion 722. A connection point 723a is present between the arm 723 and the outer rim 721 and a second connection point 723b is present between the arm 723 and the center portion 722.

The center portion 722, the outer rim 721, and the linear arm 723 each have a first surface 729a, 730a, 731a and a second surface 729b, 730b, 731b, opposite the first surface 729a, 730a, 731a. The second surface 729b, 730b, 731b is adjacent to and closer to the high pressure chamber of the piston 103.

It is noted that the first surface 730a of the outer rim 721 is adjacent to and contacts a surface 602a of the outer rim 602 of the retainer 600.

The orthoplanar spring 710 is moveable between a flat, closed position and a deformed, open position. In the flat, closed position shown in FIG. 15, the center portion 722 abuts and seals off the inlet hole to the bore 102a receiving the piston 103. When the pressure in the high pressure chamber 111 is less than the spring force of the orthoplanar spring 710, the orthoplanar spring 710 moves to the deformed, open position allowing fluid to flow from oil inlet supply 106, through the single semicircular space 766, through the inlet hole and into the high pressure chamber 111.

When the orthoplanar spring 710 is in the deformed, open position, the center portion 722 is biased outwards from the outer rim 721 such that the second surface 729b of the center portion 722 is at a distance from a first surface 730a the outer rim 721 that is greater than the distance between a second surface 731b of the linear arm 163 and the first surface 730a of the outer rim 721. In this position, the center portion 722 of the orthoplanar spring 710 can move away lateral outward or away from the outer rim 721 until the center portion 722 abuts the protrusion 606 of the retainer 600, such that the retainer 600 limits the travel of the orthoplanar spring 710 in the deformed position.

Movement of the orthoplanar spring 710 from the flat, planar closed position to the deformed, multilevel open position allows fluid to flow through the single semicircular space 766 into the high pressure chamber 111. Any force on the piston 103 towards the housing 102 causes any fluid present in the high pressure chamber 111 to flow towards supply 106, which pushes the orthoplanar spring 710 towards a flat, planar closed position.

Figure 17:
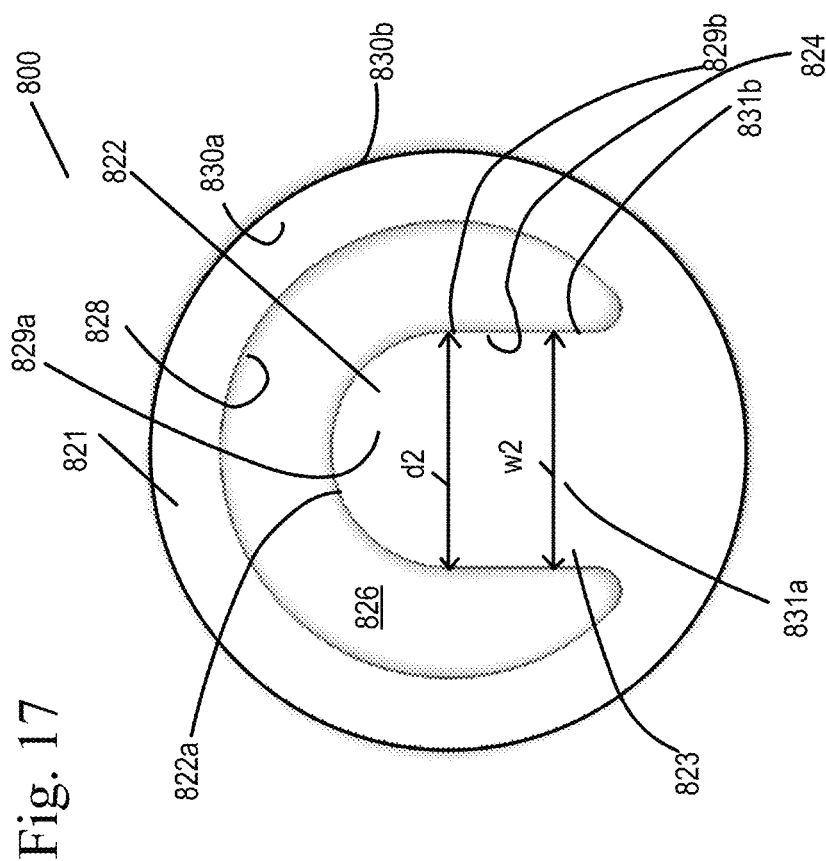
FIG. 17 shows a top view of an orthoplanar spring of a seventh embodiment.

FIG. 17 shows an alternate orthoplanar spring for use with the retainer 600.

The orthoplanar spring 800 has a single linear arm 823 connecting the outer rim 821 to a flat center portion 822. A single semicircular space 826 is present between the inner circumference 828 of the outer rim 821 and the outer surface 824 of the single linear arm 823 and the outer circumference 822a of center portion 822. It is noted that the linear arm 823 has a width w2 that is equal to than the diameter d2 of the center portion 822.

The center portion 822, the outer rim 821, and the linear arm 823 each have a first surface 829a, 830a, 831a and a second surface 829b, 830b, 831b, opposite the first surface 829a, 830a, 831a. The second surface 829b, 830b, 831b is adjacent to and closer to the high pressure chamber of the piston 103.

It is noted that the first surface 830a of the outer rim 821 is adjacent to and contacts a surface 602a of the outer rim 602 of the retainer 600.

The orthoplanar spring 800 is moveable between a flat, closed position and a deformed, open position. In the flat, closed position shown in FIG. 17, the center portion 822 abuts and seals off the inlet hole to the bore 102a receiving the piston 103. When the pressure in the high pressure chamber 111 is less than the spring force of the orthoplanar spring 800, the orthoplanar spring 800 moves to the deformed, open position allowing fluid to flow from oil inlet supply 106, through the single semicircular space 826, through the inlet hole and into the high pressure chamber 111.

When the orthoplanar spring 800 is in the deformed, open position, the center portion 822 is biased outwards from the outer rim 821 such that the second surface 829b of the center portion 822 is at a distance from a first surface 830a the outer rim 821 that is greater than the distance between a second surface 831b of the linear arm 863 and the first surface 830a of the outer rim 821. In this position, the center portion 822 of the orthoplanar spring 800 can move away lateral outward or away from the outer rim 821 until the center portion 822 abuts the protrusion 606 of the retainer 600, such that the retainer 600 limits the travel of the orthoplanar spring 800 in the deformed position.

Movement of the orthoplanar spring 800 from the flat, planar closed position to the deformed, multilevel open position allows fluid to flow through the single semicircular space 826 into the high pressure chamber 111. Any force on the piston 103 towards the housing 102 causes any fluid present in the high pressure chamber 111 to flow towards supply 106, which pushes the orthoplanar spring 800 towards a flat, planar closed position.

It is noted that the size of all of the spaces in each of the embodiments of the orthoplanar springs can vary to be made larger or smaller to increase or decrease flow rate.

While not shown, a single or multiple vent holes of a single size or various sizes can be included in the center portion of the orthoplanar springs of the above embodiments to achieve a targeted vented flow rate.

It is noted that it is possible that the orthoplanar spring of embodiments of the present application rotate during use, however this rotation does not impede the function of the orthoplanar spring within the tensioner.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner comprising:
a housing defining a bore connected to a check valve bore through an inlet hole, the check valve bore being in fluid communication with an inlet supply and the inlet hole;
a hollow piston slidably received within the bore;
a piston spring received within the bore and the hollow piston;
a high pressure chamber defined between the bore and the hollow piston;
a check valve received within the check valve bore between the inlet supply and the inlet hole to the bore, the check valve comprising an orthoplanar spring comprising:
an outer rim;
a flat center portion;
a single radiused arm connecting the outer rim to the flat center portion, the single radiused arm having an outer surface and an inner surface and surrounding at least 270 degrees of an outer circumference of the flat center portion;
a first semicircular opening defined by an inner circumference of the outer rim, and the outer surface of the single radiused arm; and
a second semicircular opening defined by at least the inner circumference of the outer rim, the outer circumference of the flat center portion, and an outer surface of the single radiused arm;
wherein the flat center portion is aligned with and adjacent to the inlet hole;
wherein the orthoplanar spring has a flat, closed position and an open deformed position in which a distance between a top surface of the outer rim and a bottom surface of the flat center portion is greater than a distance between the top surface of the outer rim and a bottom surface of the single radiused arm;
wherein when the orthoplanar spring is in the flat, closed position, the flat center portion of the orthoplanar spring seals the inlet hole and wherein when the orthoplanar spring is in the open deformed position, the flat center portion moves the distance between the top surface of the outer rim and the bottom surface of the flat center portion to unseal the inlet hole such that fluid flows from the inlet supply through the first semicircular opening, the second semicircular opening, and around the flat center portion to the high pressure chamber.

2. The hydraulic tensioner of claim 1, further comprising a retainer within the check valve bore between the orthoplanar spring and the inlet hole, the retainer comprising an annular outer rim of a width; a flat center portion; a plurality of radially extending connecting portions connecting the outer rim to the flat center portion; a plurality of openings defined between adjacent radially extending connecting portions, the flat center portion of the retainer aligned with the flat center portion of the orthoplanar spring.

* * * * *